UNITED STATES PATENT OFFICE 2,551,639

REACTION OF OLEFINS AND HALOGENATED ALKANES

Charles F. Feasley and William A. Stover, Woodbury, N. J., assignors to Socony-Vacuum Oil Company, Incorporated, a corporation of New York No Drawing. Application July 22, 1947, Serial No. 762,804

11 Claims. (Cl. 260—653)

This invention relates to a method of reacting olefins with halogenated alkanes at an elevated temperature in the absence of a catalyst and to the products obtained from said reaction.

It has heretofore been known to react olefinic materials with halogenated alkanes or akyl halides in the presence of various catalysts. Thus, catalysts of the Friedel-Crafts type, such as aluminum chloride, ferric chloride, and the like, have been used to promote the condensation or addition of organic halides and olefins. Similarly, acid catalysts, such as sulfuric acid, have been so employed. Organic peroxides have also been used to bring about the addition of halides to olefins. In our copending application, Serial Number 747,320, filed May 10, 1947, there is described a method for reacting olefins with alkyl halides in the presence of a catalyst of air or other oxygen containing gas.

In accordance with the present invention, it has now been discovered that the reaction between an olefinic hydrocarbon and a halogenated alkane can be realized in the absence of a catalyst, providing the reaction is conducted at a sufficiently elevated temperature. It has been found that by contacting an olefinic hydrocarbon with a halogenated alkane in the absence of oxygen and at a temperature between about 150° C. and about 350° C., a mixture containing a haloalkane of higher molecular weight is obtained. The resultant products are particularly useful as refrigerants, insecticide ingredients, heat transfer agents, synthetic lubricants, hydraulic fluids, solvents, and intermediates in organic synthesis.

The thermal process described herein for preparing these new reaction products represents an improvement over previously employed catalytic processes which add haloalkanes, such as carbon tetrachloride, to olefins by the use of peroxides, acids, or Friedel-Crafts catalysts. The present method eliminates the use of expensive catalysts which are difficult, if not impossible, to remove from the resulting products and recover for re-use. The present procedure, moreover, represents a direct thermal reaction between the specific reactants concerned. Separation difficulties in recovering catalysts are not encountered and the purification of the final products is simplified. Further more, the reaction products of this invention apparently differ from those produced by the aforementioned catalytic processes.

The olefinic reactant used in the reaction of this invention may be either a branched-chain olefin, a cycloolefin, or a straight-chain olefin containing from 2 to 20 carbon atoms. Generally, a straight-chain monoolefin will be employed and, preferably, a 1-olefin. However, olefins containing a double bond in a position other than the 1-position may also be utilized. Likewise, the present invention contemplates the use of olefins containing a plurality of double bonds per molecule and olefins containing various substituent atoms or groups. The olefinic reactant used may be a single olefin, a mixture of olefins, or a commercial mixture containing a substantial proportion of olefinic constituents.

The halogenated alkane reactant employed herein should preferably contain between 1 and 24 carbon atoms but may contain even a larger number of carbon atoms. Generally, a polyhalogenated alkane containing more than one halogen atom per molecule will be used; these halogens may be either the same or a different member of the halogen family and may either be attached to the same carbon atom or to different carbon atoms. At least a portion of the halogen present in the halide should suitably have an atomic weight in excess of 19. Monohaloalkanes may also be used in the reaction of the invention. The halogen substituent present may be either chlorine, fluorine, bromine or iodine. Furthermore, the halogenated alkanes contemplated for use in the present reaction may contain substituents such as cyanide, sulfate nitro, carboxyl, hydroxyl, and the like. It is essential, however, that the halogenated alkane reactant utilized be stable enough so that hydrogen halide or free halogen is not lost at temperatures below that at which the reaction of the invention takes place. On the other hand, of course, the reactants employed should be of sufficient activity to undergo the desired reaction upon being brought into contact under the proper conditions of temperature and pressure. As in the case of the olefinic reactant, the haloalkane reactant may be a single halogenated alkane, a mixture of halogenated alkanes, or a commercial mixture containing a substantial proportion of halogenated alkanes.

The reaction contemplated herein is accomplished at temperatures between about 150° C. and about 350° C. The upper temperature limit will depend in part upon the reactants employed and must be maintained low enough to avoid excessive cracking and decomposition of the reactants and the products. The lower temperature limit will likewise be dependent upon the activity of the reactants used and must be sufficiently high to initiate the reaction. The reaction time will generally be between about 2 and about 8 hours when the temperature is maintained in the above mentioned range. As a general rule, a suitable temperature should be chosen to give a suitable reaction rate without excessive degradation of the final products or reactants. The temperature will hence vary inversely with the contact time, the shorter contact time requiring the higher temperature.

The reaction will ordinarily be accomplished under superatmospheric pressure, since the application of pressure tends to favor the reaction. It has accordingly been found preferable to use high pressures generally within the range of about 250 to about 2500 pounds per square inch. However, appreciably lower pressures approaching atmospheric may also be used. Generally, a pressure at least sufficient to maintain the reactants in substantially liquid state will be utilized.

The reaction is carried out in the absence of an oxygen containing gas which, as pointed out above, is a catalyst for the reaction. Also, the specific reactants employed were free of materials such as active oxygen compounds which might act as catalysts in situ and require subsequent separation from the reaction product mixture.

The process may be carried out continuously or batchwise. For example, the reaction may be accomplished in an electrically heated, Monel lined rocking bomb which has been flushed with nitrogen and evacuated several times to insure the absence of oxygen in the reaction mixture. The reactants are charged into said bomb, which is then rocked and heated for the desired period of time, after which it is chilled and vented. The product is thereafter distilled to remove unreacted haloalkanes and olefins and to separate the various fractions of the product.

The following examples will serve to illustrate the method of carrying out the reaction in the manner described:

The characteristics of the reaction products indicate that they are mixtures of a number of different chemical compounds. It is within the scope of this invention to use any such mixtures, as produced, or to separate from any such mixture either by fractional distillation, solvent extraction or otherwise, any fraction thereof which is found suitable for any particular purpose. Generally speaking, the higher boiling fractions will be more suitable for use as synthetic lubricants, or addition agents for mineral oil, or as insecticide carriers, while the lower boiling fractions will be more suitable for use as refrigerants, selective solvents, and the like.

We claim:

1. The method for condensing a 2-olefin, all carbon atoms of which are in aliphatic groups, with a polyhalogenated alkane, the halogen atoms of which are selected from the group consisting of fluorine and chlorine, to form an unsaturated monomer, which comprises: contacting said 2-olefin with said alkane, in the absence of a catalyst, at a temperature between about 150° C. and about 350° C. and at a pressure between about 250 and about 2500 pounds per square inch.

2. The method for condensing hexadecene-1 and 1,1,2-trifluoro-1,2,2-trichloroethane to form an unsaturated monomer, $C_{18}H_{31}F_3Cl_2$, which comprises: contacting hexadecene-1 with 1,1,2-trifluoro-1,2,2-trichlorethane, in the absence of a catalyst, at a temperature between about 150° C. and about 350° C. and at a pressure between about 250 and about 2500 pounds per square inch.

3. The method for condensing isobutylene and carbon tetrachloride to form an unsaturated monomer, $C_5H_7Cl_3$, which comprises: contacting isobutylene and carbon tetrachloride, in the absence of a catalyst, at a temperature between about 150° C. and about 350° C. and at a pressure between about 250 and about 2500 pounds per square inch.

| Run No. | Reactants | Gms. | Temp., °C. | Pressure, p. s. i. | Contact Time, Hours | Grams Total of Product |
|---|---|---|---|---|---|---|
| 1 | $CF_2ClCFCl_2$ / Hexadecene-1 | 820 / 216 | 204 | 2,500 | 5.5 | 200 |
| 2 | $CCl_4$ / Octene-1 | 780 / 207 | 204–218 | 400–1,500 | 3.0 | 169 |
| 3 | $ClCH_2CH_2Cl$ / Decene-1 | 453 / 225 | 238 | 500 | 6.0 | 338 |
| 4 | $CCl_4$ / Isobutylene | 500 / 215 | 163–204 | 600 | 3.0 | 250 |
| 5 | $CCl_4$ / Octene-2 | 515 / 174 | 177–204 | 300 | 3.0 | 187 |

| Run No. | Fraction Number | Boiling Range, °C. | Wt. of Fraction, Gms. | Specific Gravity | Per Cent Cl |
|---|---|---|---|---|---|
| 1 | 1 | 270–292 | 5 | >1 | [1] 18.4 |
|   | 2 | Residue | 195 | | |
| 2 | 1 | 199–333 | 105 | | [2] 47.9 |
|   | 2 | Residue | 64 | | |
| 3 | 1 | 154–174 | 40 | | 0.97 |
|   | 2 | 188–200 | 120 | | 0.78 |
|   | 3 | 200–218 | 62 | | 5.65 |
|   | 4 | Residue | 13 | | 2.40 |
| 4 | 1 | 52 | 44 | 0.88 | 40.3 |
|   | 2 | 52–70 | 33 | 1.30 | 78.6 |
|   | 3 | 151–220 | 76 | 1.26 | [3] 61.8 |
|   | 4 | 220–390 | 75 | 1.44 | [2] 65.1 |
|   | 5 | Residue | | | |
| 5 |   | >151 | 107 | 1.07 | [2] 46.8 |

[1] $C_{18}H_{31}F_3Cl_2$—18.7% Cl.
[2] $C_9H_{15}Cl_3$—46.4% Cl.
[3] $C_5H_7Cl_3$—61.0% Cl.
[4] $C_5H_8Cl_4$—67.4% Cl.

4. The method for condensing octene-2 and carbon tetrachloride to form an unsaturated monomer, $C_9H_{15}Cl_3$, which comprises: contacting octene-2 and carbon tetrachloride, in the absence of a catalyst, at a temperature between about 150° C. and about 350° C. and at a pressure between about 250 and about 2500 pounds per square inch.

5. The method for condensing an olefinic hydrocarbon, all carbons of which are in aliphatic groups, with a halogenated alkane, the halogen atoms of which are selected from the group consisting of fluorine and chlorine, to form an unsaturated monomer, which comprises: contacting said hydrocarbon with said alkane, in the absence of a catalyst, at a temperature between about 150° C. and about 350° C. and at a pressure sufficient to maintain the reactants in a substantially liquid state.

6. The method defined by claim 5 wherein the alkane is polyhalogenated.

7. The method defined by claim 5 wherein the alkane is polyhalogenated and contains at least one fluorine atom and at least one chlorine atom.

8. The method defined by claim 5 wherein the pressure is between about 250 and about 2500 pounds per square inch.

9. The method for condensing a mono-olefin, all carbon atoms of which are in aliphatic groups, with a polyhalogenated alkane, the halogen atoms of which are selected from the group consisting of fluorine and chlorine, to form an unsaturated monomer, which comprises: contacting said olefin with said alkane, in the absence of a catalyst, at a temperature between about 150° C. and about 350° C. and at a pressure sufficient to maintain the reactants in a substantially liquid state.

10. The method defined by claim 9 wherein the mono-olefin is a 1-olefin.

11. The method defined by claim 9 wherein the mono-olefin is a 2-olefin.

CHARLES F. FEASLEY.
WILLIAM A. STOVER.

REFERENCES CITED

The following references are of record in the file of this patent:

UNITED STATES PATENTS

| Number | Name | Date |
| --- | --- | --- |
| 2,440,800 | Hanford et al. | May 4, 1948 |
| 2,468,208 | Kharasch | Apr. 26, 1949 |

FOREIGN PATENTS

| Number | Country | Date |
| --- | --- | --- |
| 581,899 | Great Britain | Oct. 26, 1946 |

OTHER REFERENCES

Kharasch et al.: Science, vol. 102, 128 (1945).

Breitenbach et al.: Zeit. für Phys. Chem., vol. A187, 175–183 (1940).

Certificate of Correction

Patent No. 2,551,639 May 8, 1951

CHARLES F. FEASLEY ET AL.

It is hereby certified that error appears in the printed specification of the above numbered patent requiring correction as follows:

Column 3, line 69, second table, last column thereof, for "² 65.1" read *65.1;* and that the said Letters Patent should be read as corrected above, so that the same may conform to the record of the case in the Patent Office.

Signed and sealed this 15th day of April, A. D. 1952.

[SEAL]

THOMAS F. MURPHY,
*Assistant Commissioner of Patents.*